United States Patent
Velten et al.

(10) Patent No.: US 9,558,715 B2
(45) Date of Patent: Jan. 31, 2017

(54) INTERACTIVE PASSENGER CABIN UNIT AND METHOD FOR CONTROLLING PRESENTATIONS THEREON

(71) Applicant: EADS Deutschland GmbH, Ottobrunn (DE)

(72) Inventors: Marc Velten, Munich (DE); Daniel Meister, Munich (DE); Rene Schubotz, Munich (DE); Jens Gaertner, Hamburg (DE)

(73) Assignee: EADS DEUTSCHLAND GMBH, Ottobrunn (DE)

( * ) Notice: Subject to any disclaimer, the term of this patent is extended or adjusted under 35 U.S.C. 154(b) by 139 days.

(21) Appl. No.: 14/032,237

(22) Filed: Sep. 20, 2013

(65) Prior Publication Data
US 2014/0085337 A1 Mar. 27, 2014

(30) Foreign Application Priority Data
Sep. 21, 2012 (DE) .......................... 10 2012 108 956

(51) Int. Cl.
*G09G 5/14* (2006.01)
*G06F 3/16* (2006.01)
(Continued)

(52) U.S. Cl.
CPC ............ *G09G 5/14* (2013.01); *B64D 11/0015* (2013.01); *G06F 3/017* (2013.01); *G06F 3/0412* (2013.01);
(Continued)

(58) Field of Classification Search
CPC ................................ G09G 5/14; G06F 3/0412
See application file for complete search history.

(56) References Cited

U.S. PATENT DOCUMENTS 7,070,150 B2    7/2006    Jones et al.
8,072,437 B2    12/2011    Miller et al.
(Continued)

FOREIGN PATENT DOCUMENTS

DE    102006007285 A1    8/2007
DE    102007008164 A1    8/2008
(Continued)

*Primary Examiner* — Joni Richer
*Assistant Examiner* — Grace Q Li
(74) *Attorney, Agent, or Firm* — Leydig, Voit & Mayer, Ltd.

(57) ABSTRACT

A passenger cabin unit of a passenger transportation vehicle includes a display device configured to present visual effects, information and images. The display device is disposed so as to completely or substantially cover surfaces of the passenger cabin unit which are visible from inside the passenger cabin unit. The display device is divided into first display regions and a second display region. Each of the first display regions is assigned to a respective individual passenger or group of passengers. A plurality of passenger command input devices are each disposed in a respective one of the first display regions and are each configured to be operated by the respective individual passenger or group of passengers to control visual presentation. A crew command input device is configured to be operated by cabin crew to control visual presentation on some or all of the first display regions and on the second display region.

19 Claims, 3 Drawing Sheets

(51) Int. Cl.
*G06F 3/041* (2006.01)
*G06F 3/01* (2006.01)
*B64D 11/00* (2006.01)
*B64D 45/00* (2006.01)

(52) U.S. Cl.
CPC ......... *G06F 3/16* (2013.01); *B64D 2011/0061* (2013.01); *B64D 2045/007* (2013.01)

(56) References Cited

U.S. PATENT DOCUMENTS

| | | | |
|---|---|---|---|
| 2005/0167546 A1* | 8/2005 | Jones et al. | 244/118.5 |
| 2008/0084542 A1* | 4/2008 | Lalley et al. | 353/10 |
| 2010/0014009 A1 | 1/2010 | Stavaeus et al. | |
| 2010/0201951 A1* | 8/2010 | Budinger | B60Q 3/025 |
| | | | 353/13 |
| 2011/0162016 A1 | 6/2011 | Petrisor et al. | |
| 2011/0163697 A1 | 7/2011 | Mizukami et al. | |
| 2012/0113255 A1* | 5/2012 | Kasuya et al. | 348/143 |
| 2012/0146953 A1 | 6/2012 | Yi et al. | |
| 2012/0154319 A1 | 6/2012 | Konicek | |
| 2013/0031215 A1* | 1/2013 | Macrae et al. | 709/219 |
| 2013/0091205 A1* | 4/2013 | Kotler | H04L 65/4015 |
| | | | 709/204 |

FOREIGN PATENT DOCUMENTS

| | | |
|---|---|---|
| WO | WO 2005079309 A2 | 9/2005 |
| WO | WO 2007093327 A1 | 8/2007 |
| WO | WO 2010123779 A2 | 10/2010 |
| WO | WO 2012070949 A1 | 5/2012 |

* cited by examiner

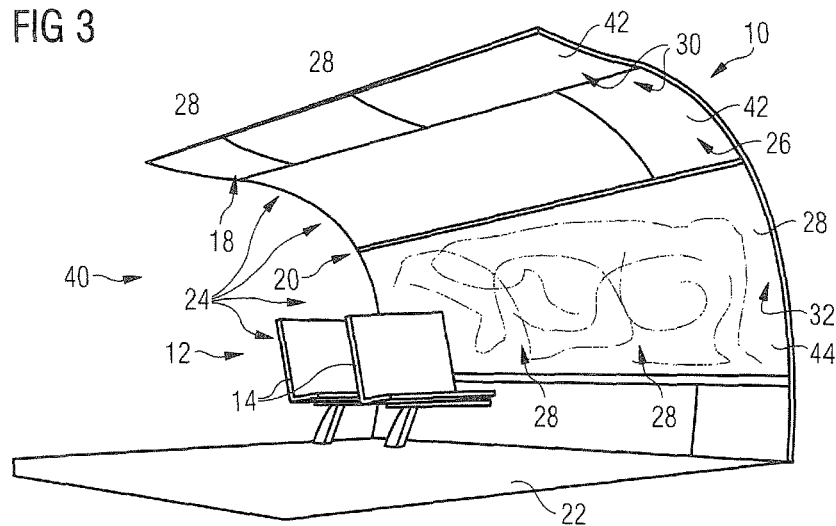

INTERACTIVE PASSENGER CABIN UNIT AND METHOD FOR CONTROLLING PRESENTATIONS THEREON

CROSS-REFERENCE TO PRIOR APPLICATION

Priority is claimed to German Patent Application No. DE 10 2012 108 956.6, filed on Sep. 21, 2012, the entire disclosure of which is hereby incorporated by reference herein.

FIELD

The invention relates to a passenger cabin unit of a passenger transportation vehicle, in particular a cabin segment of an aircraft, surfaces visible inside the passenger cabin unit being provided at least to a large extent with a display device for presenting visual information, effects and images. The invention further relates to a method for presenting visual effects, information and images to entertain and/or inform passengers inside such a passenger cabin unit.

BACKGROUND

It is not currently possible to project visually and digitally onto cabins of passenger transportation vehicles, such as buses, aircraft and rail cars, or it is only possible to project onto them in a very limited manner both spatially and in terms of content or it is not possible to control them interactively at all. In vehicles practically available on the market, there are individual monitors which are generally very small and arranged immediately in front of the passengers and which in some cases are also controllable in a certain manner by the passenger himself by way of menu navigation. Solutions implemented in practice to date are only geared to flat surfaces. So far, curved surfaces are excluded.

Current cabins and cabin design concepts only have spatially limited (only monitors), restricted (e.g. only flat surfaces) options for transmitting digital image content and are only interactive to a very limited extent.

U.S. Pat. No. 7,070,150 B2 and US 2011/0163697 A1 describe providing individual areas of an aircraft cabin with illuminated surfaces or virtual window areas on display devices.

DE 10 2007 008 164 A1 discloses a method and a device for adjusting the illumination to an image presentation on an interior surface of a passenger compartment, for which self-illuminating displays, in OLED technology for example, are configured.

DE 10 2006 007 285 A1 describes arranging lining panels in the interior of the passenger cabin of an aircraft, curved surfaces also being coated with a display for playing back information. In this case, ceiling areas in particular, that is to say an aircraft roof lining of an interior of the aircraft passenger cabin is fitted with a flexible display.

SUMMARY

In an embodiment, the present invention provides a passenger cabin unit of a passenger transportation vehicle with a display device configured to present visual effects, information and images. The display device is disposed so as to completely or substantially cover surfaces of the passenger cabin unit which are visible from inside the passenger cabin unit. The display device is divided into a plurality of first display regions and at least one second display region. Each of the first display regions is assigned to a respective individual passenger or group of passengers. A plurality of passenger command input devices are each disposed in a respective one of the first display regions and are each configured to be operated by the respective individual passenger or group of passengers to control visual presentation on the respective one of the first display regions. At least one crew command input device is configured to be operated by cabin crew to control visual presentation on a plurality or all of the first display regions and on the at least one second display region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 is a further perspective, schematic illustration with presentation by the passengers (interactive window areas) and of second display regions (interactive lining);

FIGS. 4 and 5 are an example of a presentation of different visual effects on the first display regions and the second display regions.

DETAILED DESCRIPTION

Figure 1:
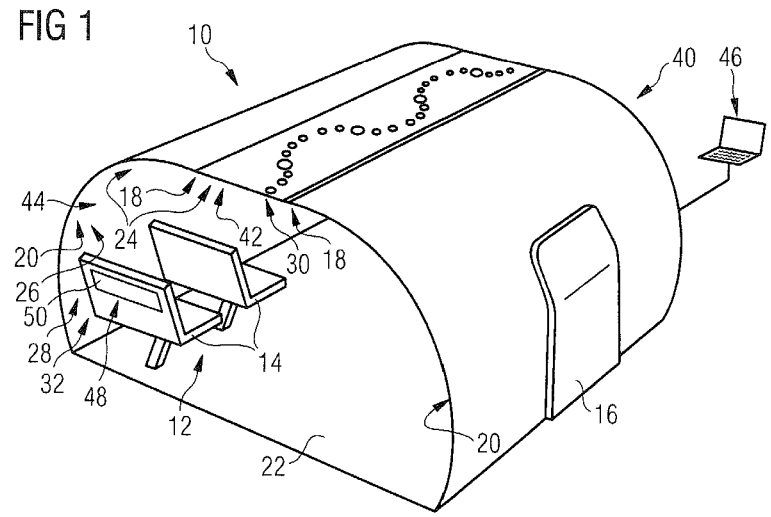
FIG. 1 is a first perspective view of a detail of a passenger cabin of an aircraft.
Figure 2:
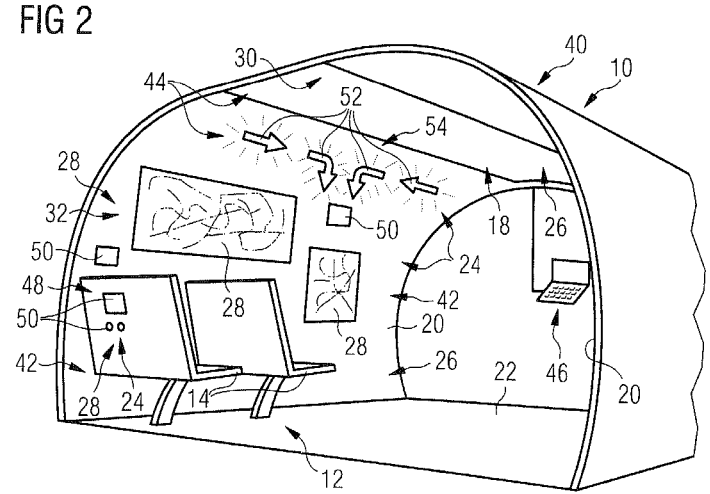
FIG. 2 is a perspective view of the passenger cabin, interior regions being shown more clearly.
Figure 5:
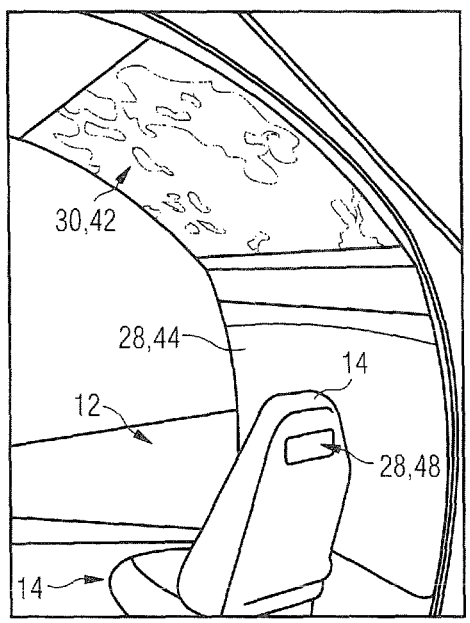

In an embodiment, the present invention provides an improved passenger cabin unit, for example of the type shown in DE 10 2006 007 285 A1, with respect to operating comfort and functional options.

The invention, in an embodiment, provides a passenger cabin unit of a passenger transportation vehicle, such as an aircraft, wherein surfaces of a passenger cabin unit which are visible from inside said passenger cabin unit are provided all-over or for the most part with a display device for presenting visual information, effects and images, wherein the display device is divided into a plurality of first display regions which are each assigned to individual passengers or a group of passengers and at least one second display region, wherein each first display region has a passenger command input device, using which the passenger can control the visual presentation on the first display region assigned to him, and wherein at least one crew command input device is provided, using which the crew can control the visual presentation on a plurality or all of the first display regions and on the second display region.

It is preferable that the passenger command input device is designed to detect commands by means of touch, gestures or speech.

It is preferable that the first display region is designed interactively over its entire surface such that commands can be detected by means of touches or approaches or movements on every surface region of the display device.

It is preferable that every first display region has a functional device for detecting touch or movement which enables drawing or painting or writing on the display region by means of touching or gestures.

It is preferable that both flat and also curved surfaces are provided all-over with the display device.

It is preferable that the central crew command input device is designed and configured to:

a) centrally change a visual surface impression in colour, arrangement, appearance or luminance or the like on the entire interior wall of the passenger cabin unit or a part thereof; and/or b) transmit information to all or some of the passengers on the first and/or the second display regions, and/or c) display signals and/or information on selected first display regions.

It is preferable that the passenger command input device is designed to:

d) display in the assigned display region a window with an outside view visually represented as an image; and/or e) display in the assigned display region a window with an outside view visually represented as an image and superimposed additional information; and/or f) display on the display region a background effect selected from a plurality of options; and/or g) create, particularly by touching or gestures, sketches or drawings or paintings.

It is preferable that the first display regions are arranged on surfaces immediately in front of and adjacent to passenger seats and that the second display region is formed by the remaining surfaces on side walls and the ceiling area.

It is preferable that the display device is designed such that the commands of the crew command input device are always given higher priority than commands of the passenger command input devices.

It is preferable that the first display regions comprise a separate personal information area immediately in front of a passenger seat and large-area other display surfaces in the area surrounding the passenger seat, the information area being designed for presenting with higher resolution and/or with greater information content and with more interactive control options than the other display surfaces.

In addition, the invention, in an embodiment, provides a method for presenting visual effects, information and images to entertain and/or inform passengers of a passenger transportation vehicle, in particular an aircraft, with: presentation of visual information, effects and images on a display device which is provided all-over or for the most part on surfaces of a passenger cabin unit which are visible from inside said passenger cabin unit; division of the display device into a plurality of first interactive display regions which are each assigned to individual passengers or a group of passengers and are interactively controllable individually by the assigned passengers, and into second display regions; control of the first display regions by the individual passengers by way of touch, gesture or speech identification devices provided on the first display regions, and control by cabin crew of the first display regions and the second display region.

A preferred embodiment creates in particular an interactively controllable all-over cabin or cabin surface that can be projected onto visually and digitally.

The separation of passive surfaces and active or interactive surfaces in the cabin is preferably eliminated by comparison with conventional passenger cabins in order to thus increase the comfort of crew and passengers and to increase the functional options. In particular, it is possible to increase the functional options for operating the passenger cabin, for taking care of air passengers, for the passenger entertainment equipment (IFE—in flight entertainment) and for safety.

A preferred embodiment of the invention is characterised by removal of the separation between passive surfaces and active/interactive surfaces and between flat and curved surfaces in the cabin. For this the cabin surface is understood as a completely interactive space onto which digital content can be projected and is designed as an all-over surface, e.g. using OLED technology. In this case, the ability to project onto flat and also curved surfaces is both provided and possible. The interaction can take place via touch/speech/gesture control.

The visual design—particularly colour, arrangement, character, luminance, etc.—of the cabin or parts of the cabin can be changed digitally within seconds. To do this, for example, different pre-stored variations can be toggled.

Different windows can be generated. For example, information windows may be generated which present certain information or other content, on the other hand virtual exterior windows can also be generated which simulate the option of the view outside even in windowless cabins. All windows can be alterable in size, movable as regards position and their content is interchangeable. For example, windows may present an outside view; background effects—"wallpaper views"—may also be generated.

For the first display regions, which are preferably situated in the immediate vicinity of a passenger seat, the passengers on this seat can choose or select their preferred presentation on the display regions themselves interactively. The second display regions can be set by the crew, such as the flight crew, for example, (also referred to as FA, short for flight attendants). The crew can also manipulate displays centrally on the first display regions or fill them with content.

For example, a design effect mode may be altered in the whole cabin. For example, a standard cabin can be presented. For this, transparent OLEDs, for example, are used which allow the background surfaces to become visible when they are not functioning. Colour transitions can be presented; a "crystalline" cabin can also be presented.

Additional functions, such as directions or emergency symbols can also be switched on, in which case these directions can be presented in the right place at the right time due to the cabin lining. For example, in an emergency it would therefore be possible, by means of corresponding direction paths, to present the emergency exits and the shortest route from each passenger seat to the nearest appropriate emergency exit. As a result, the display device can be used in particular as a guidance system for emergencies.

An interactive cabin is preferably created, an interactive interior in the region of the passengers forming the first display regions which can be manipulated by the passengers and an interactive lining, for example in the ceiling area or in the upper side area of the cabin, forming the one or two display regions.

FIGS. 1 to 5 illustrate a passenger cabin unit 10 of an aircraft in the form of a cabin segment or a detail of a cabin of an aircraft. The passenger cabin unit 10 has a passenger area 12 with passenger seats 14. This passenger area is accessible through an entrance 16. The passenger area 12 comprises an aircraft roof lining 18, side walls 20 and a floor 22 on which the passenger seats 14 are anchored.

The side walls 20 and the aircraft roof lining 18 are clad all-over with a display device 24 with which visual effects, images or information can be presented on the interior surfaces 26 directed towards the passengers on the passenger seats 14. Unlike previous display devices for passenger cabin units, the passenger cabin unit 10 illustrated here is provided with the display device 24 over the entire interior surface 26.

The display device 24 is divided into a plurality of first display regions 28, which are configured in the immediate vicinity of the passenger seats 14 or also, for example, on the rear surfaces of the backrests of the passenger seats 14, and into a second display region 30 which is configured, for example, on the aircraft roof lining 18 and in the upper region of the side walls 20.

The first display regions 28 each comprise passenger command input devices 32 with which the passengers sitting on the passenger seats 14 can control the displays on the first display regions 28 by means of touch control, gesture control or speech control.

For this purpose, the first display regions 28 are configured in particular such that they are sensitive over their entire surface to touches or approaches or they have camera-based sensitivity to thus be able to intuitively move visually presented objects on the surface of the first display region 28, to change, rotate or otherwise manipulate them in size or presentation.

Corresponding technologies are already standard for interactive display surfaces, e.g. for tablet PCs or mobile telephones, and are therefore known in principle. For further details for the possible design of the first display region 28 as an all-over interactive passenger command input interface, reference is made to the technologies which are described and illustrated in U.S. Pat. No. 8,072,437 B2, US 2012/146953 A1, US 2012/154319 A1, WO 2010/123779 A2 or WO 2012/070949; the content of these documents is incorporated herewith by reference.

In the illustrations of FIGS. 1 to 5, a visual effect, for example a blue sky with clouds, is presented on the second display region 30 in order to thus increase the comfort of all passengers, the passengers also being able to appropriately design their immediate surroundings individually on the first display regions 28. For example, it is possible here to generate and open windows which present different content. As a result it is also possible to simulate exterior windows.

Overall, it is therefore possible to design an interactive cabin 40 which is formed of the components interactive lining as second display region 30 and interactive interior 44 which has been formed by the plurality of first display regions 28. Both components 42, 44 are controllable independently of each other. The interactive interior 44 with the first display regions 28 is controllable on one hand by passengers and on the other by flight attendants. The interactive lining 42 with the second display region 30 is only controllable by the flight attendants.

For this, for example, a crew command input device 46, via which the display device 24 is controllable overall, is provided in an area not generally accessible (staff or crew area, e.g. cockpit, kitchen, FA seating area) or is otherwise restricted in access, such as by means of personal identification devices. In one embodiment, the crew command input device 46 is arranged in a fixed position. However, in a further embodiment, members of the crew can also be equipped with a mobile personal communication or control device—similar to pads or tablet PCs or smartphones or pagers or the like—which have a function as a crew command input device 46 such that the display device 24 is also controllable via mobile crew devices.

Thus the interactive interior 44 comprising the first display regions 28 can be controlled by both the passengers and also the crew. The interactive lining 42 comprising the second display region 30 can only be controlled by the crew. Moreover, both components 42, 44 can also be controlled in combination—by the crew only.

As already mentioned above, in one embodiment, at least parts of the rear surfaces of the backrests of the passenger seats 14 are also configured as interactive first display regions 28 which can be projected onto and controlled by touches, gestures or speech. These parts of the display device 24 are particularly easy to view by the passengers on the seats in the row behind and are provided as separate information areas 48 where more information can be called up and more functions for interaction by the passengers are provided than on the interactive interior 44. This separate information area 48 is usable in particular as an in-flight entertainment system (IFE). Here, for example, films can be played back or the passenger can play computer games or the like without disturbing the other passengers. In one example, the backrests are clad with interactive OLED technology for this purpose. In another embodiment, it is possible to attach communication and information devices (or personal devices) of the passengers to the rear sides of the passenger seats 14 for providing the separate information area 48. These may be the interactive monitors basically already known and in use which are usable as IFE and here additionally as the separate information areas 48, or these devices are personal devices of the passengers or mobile devices such as tablet PCs or pads or smartphones made available to them which communicate wirelessly with the cabin and can be held, for example, in holders on the backrest of the seats in front. In each of the embodiments, the passenger could pass information backwards and forwards using appropriate commands between his IFE or personal device—more generally between his separate information area 48 in front of him on the backrest of the seat in front—and his area on the interactive interior 44, wherein he can call up and control other content and information and advanced functions—e.g. keyboards for text input—on the IFE representing his separate information area 48 or personal device—whether this is an interactive OLED cladding of the backrest of the seat in front, a fixed interactive monitor, a mobile device such as a pad, smartphone or tablet device or any other device.

The first display regions 28 which are controllable by the individual passengers thus comprise the interactive interior 44 in the region of the side walls 20 which are in the vicinity of the passenger seats 14 and the separate information area 48 with the in-flight entertainment system IFE.

It is further possible to represent virtual information windows (virtual i-windows) 50 on all display regions 28, 30. The interactive information window 50 has a special position and is assigned to both components interactive lining 42 and interactive interior 44. It is controllable independently or reciprocally (communication between passenger and crew and vice versa; bridge function) by the crew and the passengers.

The virtual information window 50 can, for example, be superimposed on or graphically merged with the interactive lining 42. This is preferably carried out by the crew alone.

On the other hand, for example, passengers can drag content of the virtual information window 50 into their separate information area 48 for more extensive or direct interaction. This may take place intuitively, for example, by means of an appropriate gesture or touches.

Similarly, passengers can drag information from the separate information area 48 out of their separate information area 48 into the area of the interactive interior 44. Thus, passengers have the option, for example, to enlarge photos, film scenes, effects from computer games or other such content which is interesting per se in order to show them to other passengers on the flight on the interactive interior 44.

Figure 6:
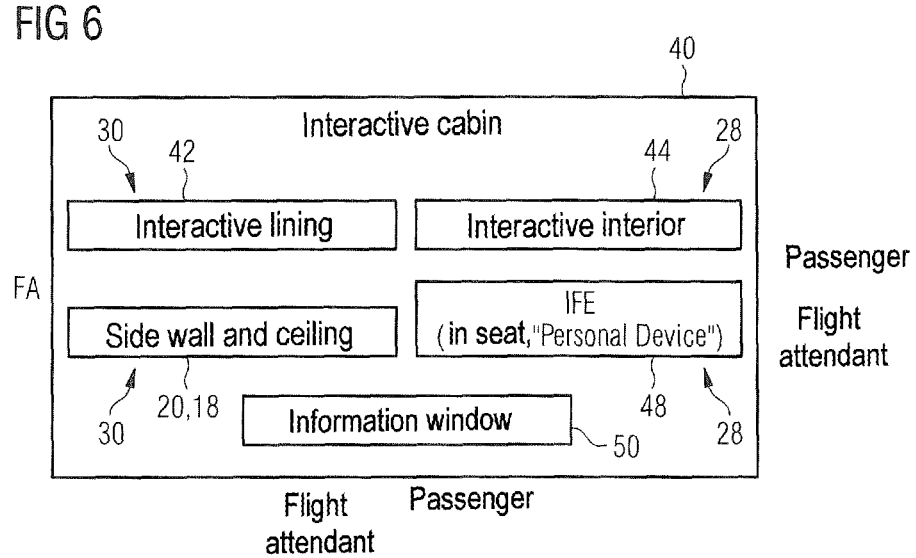
FIG. 6 is a block diagram to illustrate the operator rights for cabin crew on one hand and passengers on the other.

The options for operating the interactive cabin 40 referred to above are visualised as a block diagram in FIG. 6.

The display device 24 is accordingly controllable by central control devices as has been described in greater detail in DE 10 2006 007 285 A1.

However, with the interactive cabin 40 illustrated here, the functionalities and presentation options are considerably extended compared to the known system.

The display controller is preferably programmed in its functionality by means of appropriate software such that the following access options and functionalities can emerge.

First of all, a closer examination will be made of the options for control by the passengers.

The access of the passengers is only enabled with appropriate restrictions. For example, there is no provision here for access to the whole cabin. Access is only possible to an "own" window or an own assigned window grid. These individual windows or window grids form the various first display regions 28.

Passenger access always takes place, for example, in slave mode, the access of the crew is hierarchically higher-level.

The passenger is granted the following functions for his own window, i.e. for his own first display region 28.

The passenger can open or close or proportionally open his own window.

The passenger can move an own window within his first display region 28 (in the grid of the window grid assigned to the passenger).

The passenger can open or scale the size of the window—within his assigned first display region 28.

The passenger can change the display modes of the own window or the own first display region 28. For example, he can generate an outside view or different background effects or he can select a wallpaper mode with different backgrounds.

The passenger can superimpose additional functions as a scalable new window.

The passenger can overlay additional functions in an existing window. For example, it is possible to generate an exterior window with geographical information which displays the cities or other interesting points inside the virtual outside view (Google Earth mode).

The passenger can "drag" window content from his corresponding first display region 28 on the interactive interior 44 onto his separate information area 48, that is to say, in particular onto his personal IFE—for example, configured as a separate display in the seat. Then more extensive and more detailed accesses to the interactive content are available on the separate information area 48.

With different embodiments of the passenger cabin unit 10, it is possible to implement all or also only a few of the above-mentioned functionalities for the passengers.

In addition, in a preferred embodiment, the controller of the display device 24 is designed—for example, using appropriate software or hardware—in such a way that the crew, that is to say, in particular the crew of a passenger aircraft (flight attendants, also FA for short) is given unrestricted access to the display device 24, configured, for example, as administrator rights.

The crew has access to the whole cabin and also access to individual windows or groups of windows and therefore, for example, to individual first display regions 28 or also to grouped first display regions 28 (e.g. left-hand side, right-hand side). Commands of the crew, for example, are hierarchically higher-level compared to commands of passengers, i.e. the crew has access in master mode.

Preferably, all or some of the following functional options are implemented for the crew:

The crew can control all windows, individual windows or window groups, all first display regions 28, individual first display regions or groups of first display regions 28—in particular in accordance with the following points. It can also control the second display region 30. The crew can open, close or proportionally open all display regions 28, 30 or a group of display regions 28, 30 or individual display regions 28, 30.

The crew can move the position of the windows to the 0 position.

The crew can change or scale the size of windows.

The crew can change modes of active or open windows. For example, it is possible to switch from outside view mode to specific wallpaper backgrounds and vice versa.

The crew can superimpose additional functions as a scalable new window.

The crew can overlay additional functions in existing windows. For example, local information or similar (Google Earth mode) can be activated. For example, an emergency mode in which information is displayed in an emergency can also be activated.

The crew can change the mode of the whole cabin, for example, a standard cabin can be presented, colour transitions can be activated or background effects can be activated.

In an especially preferred exemplary embodiment, the crew can display information on the display device 24 for an emergency preferably on all display regions. As indicated by way of example in FIG. 2, flashing arrows 52 can be displayed in the appropriate places in the appropriate orientation. For example, escape and rescue routes can be displayed by corresponding symbols, such as arrows 52 and/or paths which are represented on display regions 28, 30. As a result, the interactive cabin 40 can also be used as an emergency guidance system 54. The display device 24 is configured accordingly for use as an emergency guidance system 54.

The passengers can choose from among different display modes for their active windows and their own first display regions 28.

Examples, from which the passengers can choose for their own windows or window grids and their own first display regions 28, include:

Outside view;

Outside view with superimposable additional information (e.g. point of interest (POI), city names);

Background effects or wallpaper options; examples:
colour field; this can be unmoving or moving; the colour field can glow; different colours or even colour changes can be selected;

Aquarium;

Rain forest/autumn woods/winter landscape/desert;

etc.

Drawing or "painting" option: The window serves as a digital painting field, e.g. for children or parents.

To enable the latter option, the first display region 28 in particular is configured, preferably in the region of the interactive interior 44 or also in the region of the separate information area 48, in such a way that touches with the finger (or with a rod, wand, stylus, etc.) or approaches and movements close to the display surface lead to lines on said display surface. The lines can be drawn thicker or thinner by approaching more closely or moving further away; areas can also be outlined and then coloured in, etc.

Preferably on the crew command input device 46, the crew can also choose from among different display modes for the first display regions 28 or the second display region 30. For example, there may be common access to active windows on the interactive interior 44 and on the interactive lining 42. The crew can choose in particular from all the passenger functions as listed above.

In addition, in a preferred embodiment, an emergency mode is also selectable for the crew. For example, arrows that flash in the direction of the door—e.g. entrance 16—can be displayed in an emergency mode.

A selection can be made from among various sleep, night-time or wake-up modes. Window content can thus be displayed generally darker or lighter, colour changes are achievable, etc.

Access of the crew always takes place preferably in master mode to enable an appropriate change between the sleep, night-time and wake-up modes.

The crew can choose in particular between the following modes for the presentation of the whole cabin or the whole interactive lining 42:
  Change whole cabin modes—for example, between standard cabin, colour transitions, background effect modes or wallpaper modes; illumination;
  Switch on, switch off or switch over different lining modes or cladding modes; here, for example, it is possible to generate effects such as rain forest, autumn woods or winter landscape or aquarium or a blue sky can be presented, etc.;
  Different background effects or modes on the second display region 30 can be presented in the cabin as moving. For example, a specific background effect can drift through the cabin. Thus, for example, it is possible to make an illumination or autumnal woods or the like drift towards the back or towards the front, for example, to thus accompany the catering.
  A complete outside view or a partial outside view can be created; the passengers can thus get the feeling of sitting in a vitreous or crystalline cabin.
  Emergency modes can be generated, for example, important emergency information such as arrows to the emergency exits or the like can be presented.
  Instructions or information for the passengers can be temporarily superimposed.

All the aforementioned functions can be present individually or in groups and can be correspondingly programmed and stored in the controller of the display device 24.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

10 passenger cabin unit
12 passenger area
14 passenger seat
16 entrance
18 aircraft roof lining
20 side wall
22 floor
24 display device
26 interior surfaces
28 first display region
30 second display region
32 passenger command input device
40 interactive cabin
42 interactive lining
44 interactive interior
46 crew command input device
48 separate information area
50 virtual information window
52 arrows
54 emergency guidance system

What is claimed is:

1. A passenger cabin unit of a passenger transportation vehicle, comprising:
  a display device configured to present visual effects, information and images and disposed so as to completely or substantially cover surfaces of the passenger cabin unit which are visible from inside the passenger cabin unit, the display device being divided into a plurality of first display regions and at least one second display region, wherein each of the first display regions is assigned to a respective individual passenger or group of passengers, wherein at least a portion of each of the first display regions is disposed on a sidewall of the cabin adjacent to passenger seats, wherein the at least one second display region includes at least one of a roof of the cabin and a sidewall of the cabin, and wherein each of the first display regions and the at least one second display region are operable to display at least one of an outside view and an outside view with superimposable additional information;
  a plurality of passenger command input devices each configured to receive commands provided by the respective individual passenger or group of passengers via at least one of touch, gestures, or speech and to control visual presentation on at least the respective first display region; and
  at least one crew command input device configured to receive commands provided by cabin crew to control visual presentation on a plurality or all of the first display regions and to receive commands provided by cabin crew to control visual presentation on the at least one second display region, wherein the at least one second display region is operable to represent at least one virtual information window, wherein each of the passenger command input devices is operable to receive input from the respective individual passenger or group of passengers to drag content from the at least one virtual information window represented in the at least one second display region to the respective first display regions, wherein each of the passenger command input devices is further operable to receive input from the respective individual passenger or group of passengers to display, on at least the respective first display region, a visual presentation of at least one of an outside view and an outside view with superimposable additional information, wherein the commands received by the at least one crew command input device provided by cabin crew to control visual presentation on a plurality or all of the first display regions are hierarchically higher-level than commands received by the plurality of passenger command input device provided by an individual passenger or group of passengers, and wherein the at least one crew command input device is operable to receive commands provided by cabin crew to display, on the at least one second display region, visual presentation of at least one of an outside view and an outside view with superimposable additional information.

2. The passenger cabin unit according to claim 1, wherein each of the first display regions is interactive over an entire surface thereof such that, on every surface region, commands are detectable by means of touches, approaches, or movements.

3. The passenger cabin unit according to claim 1, wherein each of the first display regions has a functional device configured to detect the commands via at least one of touch or gestures to enable at least one of drawing, painting, or writing on the first display regions.

4. The passenger cabin unit according to claim 1, wherein the surfaces include flat and curved surfaces that are completely covered by the display device.

5. The passenger cabin unit according to claim 1, wherein the at least one central crew command input device is configured to at least one of:
a) centrally change a visual surface impression in color, arrangement, appearance or luminance or the like on an entire interior wall of the passenger cabin unit or a part thereof;
b) transmit information to all or some of the passengers on at least one of the first and the second display regions, and
c) display signals and information on selected ones of the first display regions.

6. The passenger cabin unit according to claim 1, wherein each of the passenger command input devices is configured to at least one of:
a) display in the respective one of the first display regions a window with an outside view visually represented as an image;
b) display in the respective one of the first display regions a window with an outside view visually represented as an image and superimposed additional information;
c) display on the respective one of the first display regions a background effect selected from a plurality of options; and
d) create, in accordance with received touch or gesture commands, sketches, drawings, or paintings.

7. The passenger cabin unit according to claim 1, wherein another portion of the first display regions is arranged on surfaces immediately in front of passenger seats, and wherein the at least one second display region is formed by remaining surfaces on side walls and a ceiling area.

8. The passenger cabin unit according to claim 1, wherein the display device is configured to always give higher priority to commands of the at least one crew command input device than to commands of the passenger command input devices.

9. The passenger cabin unit according to claim 1, wherein the first display regions include a separate personal information area immediately in front of a passenger seat and large-area other display surfaces in an area surrounding the passenger seat, the personal information area having more interactive control options and at least one of a higher resolution and greater information content than the other display surfaces.

10. The passenger cabin unit according to claim 1, wherein the display device is configured, upon control by crew, to display emergency information, arrows, escape or rescue routes on at least one of the first and the second display regions in order to guide people to nearest emergency exits.

11. An aircraft including the passenger cabin unit according to claim 1.

12. The passenger cabin unit according to claim 1, wherein each of the passenger command input devices is operable to receive input from the respective individual passenger or group of passengers to drag content from the at least one virtual information window represented in the at least one second display region to the portion of the respective first display region disposed on the sidewall of the cabin such that the at least one virtual information window is represented in the portion of the respective first display region disposed on the sidewall of the cabin, and
wherein each of the passenger command input devices is operable to receive input from the respective individual passenger or group of passengers to drag content from the at least one virtual information window represented in the portion of the respective first display region disposed on the sidewall of the cabin to another portion of the respective first display region arranged on a surface immediately in front of the respective individual passenger or group of passengers.

13. The passenger cabin unit according to claim 1, wherein the at least one virtual information window is assigned to the at least one second display region and is also assigned to at least one of the plurality of first display regions.

14. The passenger cabin unit according to claim 13, wherein the at least one virtual information window has a special position.

15. The passenger cabin unit according to claim 1, wherein the at least one crew command input device is operable to superimpose the at least one virtual information window on the at least one second display region.

16. The passenger cabin unit according to claim 1, wherein the at least one virtual information window is controllable at least one of:
independently by the crew and passengers or reciprocally by the crew and passengers.

17. A method for presenting visual effects, information and images to entertain or inform passengers of a passenger transportation vehicle, comprising:
disposing a display device so as to completely or substantially cover surfaces of a passenger cabin unit which are visible from inside the passenger cabin unit, the display device being divided into a plurality of first display regions and at least one second display region, each of the first display regions being assigned to a respective individual passenger or group of passengers and being individually interactively controllable by the respective individual passenger or group of passengers, at least a portion of each of the first display regions being disposed on a sidewall of the cabin adjacent to passenger seats, the at least one second display region including at least one of a roof of the cabin and a sidewall of the cabin, each of the first display regions and the at least one second display region being operable to display at least one of an outside view and an outside view with superimposable additional information;

presenting the visual effects, information and images on the display device;

providing for control, by the respective individual passengers or group of passengers, of the first display regions by way of touch, gesture or speech identification devices provided on the first display regions;

providing for control of the portion of each first display region disposed on the sidewall of the cabin adjacent to passenger seats by the respective individual passengers or group of passengers assigned thereto by way of the touch, gesture, or speech identification devices provided on the first display regions;

providing for control, by cabin crew, of the first display regions and the second display region;

representing, in the at least one second display region, at least one virtual information window;

receiving input, via a first passenger command input device, from the respective individual passenger or group of passengers to drag content from the at least one virtual information window represented in the at least one second display region to a target first display region;

receiving input, via the first passenger command input device, from the respective individual passenger or group of passengers to display, on at least the target first display region, a visual presentation of at least one of an outside view and an outside view with superimposable additional information; and receiving input, via the crew command input device, to display, on the at least one second display region, visual presentation of at least one of an outside view and an outside view with superimposable additional information, wherein control of the first display regions by cabin crew is hierarchically higher-level than control of the first display region by respective individual passengers or groups of passengers.

18. The method according to claim 17, further comprising presenting escape or rescue routes on at least one of the first and the second display regions in order to guide the passengers to nearest emergency exits in each case.

19. The method according to claim 17, wherein the disposing the display device is performed in the passenger cabin unit of an aircraft.

* * * * *